in

US011062412B2

(12) United States Patent
Bullard et al.

(10) Patent No.: US 11,062,412 B2
(45) Date of Patent: Jul. 13, 2021

(54) MACHINES AND PROCESS FOR MANAGING A SERVICE ACCOUNT

(71) Applicant: TouchPay Holdings, LLC, Reston, VA (US)

(72) Inventors: Charles Craig Bullard, Aledo, TX (US); David DuWayne Wise, Bedford, TX (US); Stephen Lee Hodge, Aubry, TX (US)

(73) Assignee: TouchPay Holdings, LLC, Reston, VA (US)

( * ) Notice: Subject to any disclaimer, the term of this patent is extended or adjusted under 35 U.S.C. 154(b) by 617 days.

(21) Appl. No.: 15/350,603

(22) Filed: Nov. 14, 2016

(65) Prior Publication Data

US 2017/0061560 A1    Mar. 2, 2017

Related U.S. Application Data

(63) Continuation-in-part of application No. 11/017,504, filed on Dec. 20, 2004, now abandoned.
(Continued)

(51) Int. Cl.
*G06Q 50/26* (2012.01)
*G06Q 20/20* (2012.01)
(Continued)

(52) U.S. Cl.
CPC ............ *G06Q 50/26* (2013.01); *G06F 3/041* (2013.01); *G06Q 20/14* (2013.01); *G06Q 20/18* (2013.01);
(Continued)

(58) Field of Classification Search
CPC ........ G06Q 50/26; G06Q 20/14; G06Q 20/18; G06Q 20/202; G06Q 20/204; G06F 3/041;
(Continued)

(56) References Cited

U.S. PATENT DOCUMENTS 3,484,560 A    12/1969  Jaeger et al.
4,054,756 A    10/1977  Comella et al.
(Continued)

FOREIGN PATENT DOCUMENTS

WO    WO 98/11714 A2 *   3/1998    ............. G07F 19/20
WO    WO 98/13993          4/1998
WO    WO 01/45380          6/2001

OTHER PUBLICATIONS

Securus Technologies, Inc. Completes Transaction to Acquire JPay Inc. Jul. 2015, PR Newswire Association LLC (Year: 2015).*
(Continued)

*Primary Examiner* — Kenneth Bartley
*Assistant Examiner* — Gregory M James
(74) *Attorney, Agent, or Firm* — Sterne, Kessler, Goldstein & Fox P.L.L.C.

(57) ABSTRACT

A machine and process for accepting customer payments and placing orders for telecommunications services is disclosed. The machine and process include a kiosk operable to accept account set-up information from an individual, accept payment from the individual, collect identifying data from the individual, and communicate with a system to activate a telecommunication account for the individual. The kiosk may be placed wherever quick telecommunication account set-up and payment verification is necessary, for example: a correctional facility or college campus.

18 Claims, 9 Drawing Sheets

Related U.S. Application Data (60) Provisional application No. 60/572,555, filed on May 19, 2004.

(51) Int. Cl.

| | | |
|---|---|---|
| G06Q 20/18 | (2012.01) | |
| G06Q 20/14 | (2012.01) | |
| G06F 3/041 | (2006.01) | |
| H04N 7/18 | (2006.01) | |
| H04M 15/00 | (2006.01) | |
| H04M 3/38 | (2006.01) | |
| H04M 17/00 | (2006.01) | |

(52) U.S. Cl.
CPC ......... *G06Q 20/202* (2013.01); *G06Q 20/204* (2013.01); *H04M 3/38* (2013.01); *H04M 15/00* (2013.01); *H04M 15/47* (2013.01); *H04M 15/59* (2013.01); *H04M 17/00* (2013.01); *H04N 7/188* (2013.01); *H04M 2215/0148* (2013.01)

(58) Field of Classification Search
CPC ........ H04M 3/38; H04M 15/00; H04M 15/47; H04M 15/59; H04M 17/00; H04M 2215/0148; H04N 7/188
See application file for complete search history.

(56) References Cited

U.S. PATENT DOCUMENTS

| | | |
|---|---|---|
| 4,069,488 A | 1/1978 | Fiorenza et al. |
| 4,191,860 A | 3/1980 | Weber |
| 4,677,609 A | 6/1987 | Piereth et al. |
| 4,935,956 A | 6/1990 | Hellwarth et al. |
| 5,319,702 A | 6/1994 | Kitchin et al. |
| 5,469,497 A | 11/1995 | Pierce et al. |
| 5,539,812 A | 7/1996 | Kitchin et al. |
| 5,634,126 A | 5/1997 | Norell |
| 5,659,165 A | 8/1997 | Jennings et al. |
| 5,677,945 A | 10/1997 | Mullins et al. |
| 5,761,071 A | 6/1998 | Bernstein |
| 5,768,355 A | 6/1998 | Salibrici et al. |
| 5,778,313 A | 7/1998 | Fougnies |
| 5,787,156 A | 7/1998 | Katz |
| 5,802,299 A | 9/1998 | Logan et al. |
| 5,822,215 A | 10/1998 | Hohmann et al. |
| 5,854,975 A | 12/1998 | Fougnies et al. |
| 6,052,454 A | 4/2000 | Kek et al. |
| 6,131,810 A | 10/2000 | Weiss et al. |
| 6,185,414 B1 | 2/2001 | Brunner |
| 6,198,915 B1 | 3/2001 | McGregor et al. |
| 6,308,887 B1 | 10/2001 | Korman et al. |
| 6,337,903 B1 | 1/2002 | Manner |
| 6,381,321 B1 | 4/2002 | Brown et al. |
| 6,505,774 B1 | 1/2003 | Fulcher et al. |
| 6,529,593 B2 | 3/2003 | Nelson |
| 6,570,970 B2 | 5/2003 | Gruchala et al. |
| 6,581,827 B2 | 6/2003 | Welton |
| 6,628,766 B1 | 9/2003 | Hollis |
| 6,639,977 B1 | 10/2003 | Swope et al. |
| 6,688,518 B1 | 2/2004 | Valencia |
| 6,788,771 B2 | 9/2004 | Manto |
| 6,793,128 B2 * | 9/2004 | Huffman .............. H04N 1/2166 235/375 |
| 6,819,932 B2 | 11/2004 | Allison et al. |
| 6,836,540 B2 | 12/2004 | Falcone et al. |
| 7,006,993 B1 * | 2/2006 | Cheong ................. G06Q 20/02 705/35 |
| 7,015,945 B1 | 3/2006 | Sullivan |
| 7,042,992 B1 | 5/2006 | Falcone et al. |
| 7,046,779 B2 | 5/2006 | Hesse |
| 7,079,636 B1 | 7/2006 | McNitt et al. |
| 7,106,843 B1 * | 9/2006 | Gainsboro .......... H04M 3/2281 379/191 |
| 7,178,720 B1 | 2/2007 | Strubbe et al. |
| 7,197,560 B2 | 3/2007 | Caslin et al. |
| 7,246,740 B2 | 7/2007 | Swift et al. |
| 7,256,816 B2 | 8/2007 | Profanchik et al. |
| 7,324,637 B2 | 1/2008 | Brown et al. |
| 7,333,798 B2 | 2/2008 | Hodge |
| 7,383,213 B1 | 6/2008 | Walter |
| 7,437,144 B1 | 10/2008 | Andresen et al. |
| 7,496,345 B1 | 2/2009 | Rae et al. |
| 7,505,406 B1 | 3/2009 | Spadaro et al. |
| 7,529,357 B1 | 5/2009 | Rae et al. |
| 7,551,732 B2 | 6/2009 | Anders |
| 7,742,581 B2 | 6/2010 | Hodge et al. |
| 7,742,582 B2 | 6/2010 | Harper |
| 7,783,021 B2 | 8/2010 | Hodge |
| 7,881,446 B1 | 2/2011 | Apple et al. |
| 7,899,167 B1 | 3/2011 | Rae |
| 8,014,800 B2 | 9/2011 | Törnkvist |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,489,068 B1 | 7/2013 | Edwards et al. |
| 8,509,390 B2 | 8/2013 | Harper |
| 8,529,462 B2 * | 9/2013 | Crucilla ................ A61B 5/097 600/532 |
| 8,577,003 B2 | 11/2013 | Rae |
| 8,626,118 B2 | 1/2014 | Smith et al. |
| 8,750,486 B1 | 6/2014 | Keiser |
| 8,855,280 B1 * | 10/2014 | Passe .................. H04M 3/2281 379/126 |
| 9,043,813 B2 | 5/2015 | Hanna et al. |
| 9,077,680 B2 | 7/2015 | Harper |
| 2001/0034720 A1 | 10/2001 | Armes |
| 2001/0047310 A1 | 11/2001 | Russell |
| 2002/0046057 A1 | 4/2002 | Ross |
| 2002/0061092 A1 | 5/2002 | Maropis et al. |
| 2002/0071537 A1 | 6/2002 | Gainsboro |
| 2002/0103762 A1 | 8/2002 | Lopez et al. |
| 2002/0128970 A1 | 9/2002 | Ghafoor |
| 2002/0183040 A1 | 12/2002 | Lundstrom et al. |
| 2002/0194096 A1 | 12/2002 | Falcone |
| 2003/0046226 A1 | 3/2003 | Iue et al. |
| 2003/0066876 A1 | 4/2003 | Goldman et al. |
| 2003/0086546 A1 | 5/2003 | Falcone et al. |
| 2003/0097332 A1 | 5/2003 | Glasinski |
| 2003/0141360 A1 | 7/2003 | De Leo et al. |
| 2003/0168508 A1 | 9/2003 | Daellenbach et al. |
| 2003/0174826 A1 | 9/2003 | Hesse |
| 2003/0193961 A1 | 10/2003 | Moore et al. |
| 2003/0198325 A1 | 10/2003 | Bayne |
| 2004/0004118 A1 | 1/2004 | Goodfellow |
| 2004/0022137 A1 * | 2/2004 | Campbell .............. B60R 21/02 369/1 |
| 2004/0022380 A1 | 2/2004 | Lynam |
| 2004/0029564 A1 | 2/2004 | Hodge |
| 2004/0058667 A1 | 3/2004 | Pienmaki et al. |
| 2004/0140350 A1 * | 7/2004 | Valencia ................. G07F 9/10 235/375 |
| 2004/0177319 A1 | 9/2004 | Horn |
| 2005/0046697 A1 | 3/2005 | Van Cleave et al. |
| 2005/0098621 A1 | 5/2005 | de Sylva |
| 2005/0259801 A1 * | 11/2005 | Bullard ................. H04M 15/00 379/144.01 |
| 2006/0031126 A1 * | 2/2006 | Ma ...................... G06Q 30/0601 705/26.1 |
| 2006/0064379 A1 | 3/2006 | Doran et al. |
| 2006/0098796 A1 | 5/2006 | Link |
| 2006/0149644 A1 | 7/2006 | Salmar et al. |
| 2007/0055439 A1 * | 3/2007 | Denker ................. G01S 5/0036 701/532 |
| 2007/0155411 A1 | 7/2007 | Morrison |
| 2007/0263812 A1 | 11/2007 | Polozola et al. |
| 2008/0091944 A1 | 4/2008 | von Mueller et al. |
| 2008/0175362 A1 | 7/2008 | Bangor et al. |
| 2008/0220739 A1 | 9/2008 | Muolo et al. |
| 2009/0042539 A1 | 2/2009 | Jiang et al. |
| 2009/0229950 A1 | 9/2009 | Nakamoto |

(56) References Cited

U.S. PATENT DOCUMENTS

| | | | | |
|---|---|---|---|---|
| 2009/0311963 | A1* | 12/2009 | Haverty | H04K 3/226 455/63.1 |
| 2010/0070414 | A1 | 3/2010 | Call et al. | |
| 2010/0299761 | A1 | 11/2010 | Shapiro | |
| 2011/0130118 | A1* | 6/2011 | Fan | H04M 15/00 455/411 |
| 2011/0213618 | A1* | 9/2011 | Hodge | G07F 19/20 705/1.1 |
| 2011/0249081 | A1* | 10/2011 | Kay | H04M 3/5315 348/14.03 |
| 2012/0016518 | A1* | 1/2012 | Saario | G06Q 20/18 700/232 |
| 2012/0189110 | A1 | 7/2012 | Bullard et al. | |
| 2012/0254026 | A1 | 10/2012 | Lotzer et al. | |
| 2013/0179949 | A1 | 7/2013 | Shapiro | |
| 2013/0215275 | A1* | 8/2013 | Berini | G06F 21/32 348/150 |
| 2014/0218466 | A1* | 8/2014 | Bloms | H04N 7/152 348/14.09 |
| 2014/0273929 | A1* | 9/2014 | Torgersrud | H04M 15/886 455/406 |
| 2014/0282898 | A1* | 9/2014 | Torgersrud | H04L 63/104 726/4 |
| 2014/0287715 | A1* | 9/2014 | Hodge | H04W 4/24 455/406 |
| 2015/0070236 | A1* | 3/2015 | Walters | H01Q 1/526 343/841 |
| 2015/0271777 | A1* | 9/2015 | Torgersrud | H04W 4/021 455/456.3 |
| 2016/0007201 | A1* | 1/2016 | Torgersrud | H04L 63/0876 455/411 |
| 2016/0034871 | A1* | 2/2016 | Vargas | G06Q 20/18 705/43 |
| 2016/0191484 | A1 | 6/2016 | Gongaware | |

OTHER PUBLICATIONS

"Automated Coin Toll System (ACTS)," Telephone World, accessed at http://www.phworld.org/payphone/acts.htm, archived by web.archive.org on Feb. 28, 2009.
"Cisco IAD2400 Series Business-Class Integrated Access Device", Cisco Systems Datasheet, 2003.
"Commissary and Telephone Accounts," Lancaster County, Pennsylvania, Apr. 2009, available at http://web.co.lancaster.pa.us/DocumentCenter/View/332.
"Criminal Calls: A Review of the Bureau of Prisons' Management of Inmate Telephone Privileges," USDOJ/OIG Special Report, Chapter 2, Aug. 1999, available at http://www.justice.gov/oig/special/9908/.
"Criminal Calls: A Review of the Bureau of Prisons' Management of Inmate Telephone Privileges," USDOJ/OIG Special Report, Table of Contents, Aug. 1999, available at http://www.justice.gov/oig/special/9908/.
"Customer Owned Coin Operated Telephones (COCOT)," Telephone World, accessed at http://www.phworld.org/payphone/cocot.htm, archived by web.archive.org on Jan. 27, 2009.
"History and Key Milestones," Logica, accessed at http://www.logica.com/history+and+key+milestones/350233679, archived by web.archive.org on Dec. 24, 2009.
"Inmate Phone System: Technology Pushes Ahead," Virginia Sheriffs' Institute, Jun. 30, 2009, available at https://vasheriffsinstitute.org/2009/06/30/inmatephonesystemtechnologypushesahead/.
"Invitation for Bids: For Inmate Commissary Services at the Cumberland County Prison," Cumberland County Prison, Pennsylvania, Pre-bid Conference, Apr. 27, 2010, available at http://www.ccpa.net/DocumentCenter/HomeNiew/6564.
"SIP and IPLinkTM in the Next Generation Network: An Overview," Intel, 2001.
"Survey of Telephone Switching: Chapter 11," Telephone Tribute, accessed at http://www.telephonetribute.com/switches survey chapter 11 .html, archived by web.archive.org on Jul. 14, 2009.
"TSPS History," Privateline.com: Circuits and Systems, available at http://www.privateline.com/circuits/TSPS history.htm, last retrieved Apr. 29, 2015.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone Privileges," U.S. Department of Justice, Office of the Inspector General, Aug. 1999.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.
Aggarwal, et al., "An Environment for Studying Switching System Software Architecture," IEEE, Global Telecommunications Conference, 1988.
Ahimovic et al., "Services for Tomorrow's PCS," IEEE International Conference on Universal Personal Communications, vol. 1, Oct. 12-15, 1993; pp. 222-227.
Assignment of U.S. Pat. No. 8,190,121 and U.S. Appl. No. 13/449,308.
Brown, et al., "SMS: The Short Message Service," Computer, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.
Corbató et al., "Introduction and Overview of the MULTICS System," Proceedings—Fall Joint Computer Conference, 1965.
Definition of "code", Microsoft Computer Dictionary, 5th Edition, Redmond, WA: Microsoft Press, 2002; p. 106.
Definition of "telephony", McGraw-Hill Dictionary of Scientific and Technical Terms, 6th Edition (McGraw-Hill, 2003).
Definitions of "code", "comprise", "number", and "including", The American Heritage College Dictionary, 3rd Edition (Houghton Mifflin Company, 1997); 10 pages.
Definitions of "Local Area Network (LAN)" and "Wide Area Network (WAN)," Microsoft Computer Dictionary (Microsoft Press 2002), pp. 304 and 561.
Digital Copy of "Bellcore Notes on the Networks," Bellcore, Special Report SR-2275, Issue 3, Dec. 1997.
Excerpts from the Prosecution History of U.S. Appl. No. 10/135,878, filed Apr. 29, 2002.
File History of U.S. Pat. No. 7,899,167, U.S. Appl. No. 10/642,532, filed Aug. 15, 2003.
File History of U.S. Pat. No. 8,190,121, U.S. Appl. No. 12/103,138, filed Apr. 15, 2008.
File History of U.S. Pat. No. 8,489,068, U.S. Appl. No. 12/766,159, filed Apr. 23, 2010.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
Reexamination U.S. Appl. No. 90/012,802 of U.S. Pat. No. 8,190,121, filed Mar. 1, 2013.
Final Office Action directed to U.S. Appl. No. 13/244,333, dated Oct. 19, 2015; 8 pages.
Garner, et al., "Mobile Terminated SMS Billing—Exploits and Security Analysis," IEEE International Conference on Information Technology: New Generations, 2006.
IEEE 100: The Authoritative Dictionary of IEEE Standard Terms, Seventh Edition, Standards Information Network, IEEE Press (2000).

(56) References Cited

OTHER PUBLICATIONS

Ismail, et al., "Prepaid and Postpaid VoIP Service Enhancements 1013 and Hybrid Network Performance Measurement," Information Technology Journal, vol. 5, Issue 2, 2006.

Jeff Hewett and Lee Dryburgh, Signaling System No. 7 (SS7/C7): Protocol, Architecture, and Services (Networking Technology) at 85 (Cisco Press, Jun. 2005).

Joint Claim Construction and Prehearing Statement, Exhibit B: Securus' Intrinsic and Extrinsic Evidence Charts, *Global Tel Link Corporation v. Securus Technologies, Inc.*, No. 3:14-cv-00829-K (N.D. Tex.), Sep. 26, 2014.

McKitterick et al., "State of the Art Review of Mobile Payment Technology," Department of Computer Science, Trinity College Dublin, 2003; 22 pages.

Operator Service System Generic Requirements, OSSGR, TR-TSY-000271, Collect Billing, Rev. 3, Mar. 1988; 50 pages.

Osifchin, N., "A Telecommunications Buildings/Power Infrastructure in a New Era of Public Networking," IEEE 2000.

PacketCableTM 1.0 Architecture Framework Technical Report, PKT-TR-ARCH-V0 1-001201 (Cable Television Laboratories, Inc. 1999).

Pages from http://www.corp.att.com/history, archived by web.archive.org on Nov. 4, 2013.

Photocopy of "Bellcore Notes on the Networks (Formerly BOC Notes on the LEC Networks)," Bellcore, Special Report SR-2275, Issue 3, Dec. 1997.

Product Handbook: Technology the World Calls on, 8th ed. Dec. 1989.

Prosecution History of International Patent Application No. PCT/US99/09493 by Brown et al.

Prosecution History of U.S. Appl. No. 09/072,436, filed May 4, 1998.

Prosecution History of U.S. Appl. No. 11/045,589, filed Jan. 28, 2005.

Prosecution History of U.S. Appl. No. 11/609,397, filed Dec. 12, 2006.

Prosecution History of U.S. Appl. No. 12/975,077, filed Dec. 21, 2010.

Response to Office Action, filed Jan. 6, 2009, in Prosecution History of U.S. Appl. No. 10/642,532, filed Aug. 15, 2003.

Rey, R.F., ed., "Engineering and Operations in the Bell System," 2nd Edition, AT&T Bell Laboratories: Murray Hill, NJ, 1983.

Schwartz, et al., "How to Build an SMS Service," O'Reilly Short Cuts, 2007.

Science Dynamics, Inmate Telephone Control Systems, http://scidyn.com/fraudprev_main.htm (archived by web.archive.org on Jan. 12, 2001).

Science Dynamics, SciDyn BubbleLINK, http://www.scidyn.com/products/bubble.html (archived by web.archive.org on Jun. 18, 2006).

Science Dynamics, SciDyn Call Control Solutions: Commander II, http://www.scidyn.com/products/commander2.html (archived by web.archive.org on Jun. 18, 2006).

Science Dynamics, SciDyn IP Gateways, http://scidyn.com/products/ipgateways.html (archived by web.archive.org on Aug. 15, 2001).

Science Dynamics, Science Dynamics—IP Telephony, http://www.scidyn.com/iptelephony_maim.htm (archived by web.archive.org on Oct. 12, 2000).

Silberschatz, et al., Operating System Concepts, Third Edition, Addison-Wesley: Reading, MA, Sep. 1991.

Sundstrom, K., "Voice over IP: An Engineering Analysis," Master's Thesis, Department of Electrical and Computer Engineering, University of Manitoba, Sep. 1999.

Tanenbaum, A., Modern Operating Systems, Third Edition, Peason Prentice Hall: London, 2009.

The Line Information Database (LIDB) and Wireless Services, Telcordia Technologies White Paper, Dec. 2001; 31 pages.

U.S. Appl. No. 60/607,447, "IP-based telephony system and method," to Apple, et al., filed Sep. 3, 2004.

U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

U.S. Appl. No. 12/766,159, "System and Method for Completion of all Calls Using Single Call Funding Options," to Edwards et al., filed Apr. 23, 2010; 39 pages.

Valcourt, et al., "Investigating mobile payment: Supporting technologies, methods, and use," IEEE International Conference on Wireless and Mobile Computing, Networking, and Communications, 2005.

Wireless Interconnection and Reciprocal Compensation Agreement Between Community Telephone Company and United States Cellular Corporation, Apr. 24, 2006; 29 pages.

Definition of "circuit switching", Newton's Telecom Dictionary, 10th Edition, 1996.

File History of U.S. Appl. No. 14/703,639, filed May 4, 2015.

Rosenberg, et al., "SIP: Session Initial Protocol," Network Working Group, Standard Track, 2002.

"VoIP Adoption Still Growing in Consumer and Business Markets," accessed at http://www.voicewalker.net/news/voip-adoption-stillgrowing-in-consumer-and-business-markets/, archived by web.archive.org on Jul. 28, 2012.

International Search Report and Written Opinion directed to related International Patent Application No. PCT/US17/61576, dated Feb. 26, 2018; 11 pages.

\* cited by examiner

MACHINES AND PROCESS FOR MANAGING A SERVICE ACCOUNT

This application is a continuation-in-part from U.S. application Ser. No. 11/017,504 filed on Dec. 20, 2004, claims priority to U.S. Provisional Patent Application No. 60/572,555, filed on May 19, 2004, by the inventors and of the same title, which is hereby incorporated by reference.

BACKGROUND OF THE INVENTION

Field of the Invention

This invention relates generally to the field of telecommunications and more specifically it relates to a machine and process for rapidly accepting customer payments and placing orders for telecommunications services.

Background Art

Since the inception of facility based call processing in correctional facilities, telecommunications providers have struggled with a variety of issues including new account set-up, collection of monies, and posting of payments in a timely manner. New account set-up for inmates and friends or family that desire to engage in telephone conversations with an inmate may take as long as two to three business days. Once the account is set-up then the issue of payment method must be resolved. Currently, telecommunications providers will accept payment by check or money order via the U.S. Postal Service; by credit card, debit card, or direct funds transfer from an existing checking account via an Interactive Voice Response System accessed by telephone; or by Western Union.

Because customers expect fast and efficient service, the above described system tends to create customer service calls that costs to the telecommunication provider. Therefore, it would be preferred to have a system that can establish new accounts rapidly and reduce customer service calls relating to account set-up delays.

Customers also expect to be able to use cash for most transactions without a penalty. The current system requires a money order and the delay of mailing to hinder the use of cash in the telecommunication service transaction. Therefore, it would be preferred to have a system that allowed easy cash payment to set-up and maintain telecommunication service for an inmate by the inmate at booking, by the inmate during incarceration, and by friends or family who are not incarcerated.

As an attempt to address some of the delays in set-up, telecommunications providers have incurred high levels of bad debt. Bad debt is expensive to incur because of the administrative overhead involved in carrying and managing the debt as well as the direct write-offs. It would be preferred to have a system that quickly verified payments to reduce bad debt while also providing quick set-up and reducing calls to customer service.

A final problem facing the current system of providing telecommunications services in correctional institutions is that of the short stay inmate, for example an inmate who may stay in lockup for less than 3 days while arranging bail. The time lag for set-up for these inmates is longer than their anticipated stay, so the telecommunication provider has no opportunity to effectively serve these potential clients. This is lost business for the telecommunication provider and an aggravation for the inmate who is unable to communicate effectively with friends or family.

Although the problems listed above are specific to the correctional facilities market, similar problems are found in other situations where the invention may be helpful. Therefore, the invention described below is not to be limited to correctional facilities, nor is the invention to be limited to solving the problems listed above.

BRIEF SUMMARY OF THE INVENTION

There is a need in correctional facilities and other markets for a machine and process for accepting customer payments and placing orders relating to telecommunications services.

Therefore, it is an object of the present invention to provide a machine and process for accepting customer payments and placing orders relating to telecommunications services.

This object may be achieved by providing a kiosk operable to accept account set-up information from an individual, accept payment from the individual, collect identifying data from the individual, and communicate with a system to activate a telecommunication account for the individual. The kiosk may be placed wherever quick telecommunication account set-up and payment verification is necessary, for example: a correctional facility or a college campus.

The present invention provides significant advantages, including: (1) set-up information may be collected in a variety of written languages without the need for extensive translation services; (2) payment may be verified at the point of sale thereby avoiding bad debts; (3) identifying data may be stored with a transaction record to facilitate matching the transaction to a particular person; (4) account activation may be automated and provided at the time of transaction; and (5) costs per account may be reduced by reducing costs associated with account set-up inquiries and associated customer service calls.

Additional objectives, features, and advantages of the invention will be apparent in the written description that follows.

BRIEF DESCRIPTION OF THE DRAWINGS/FIGURES

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings:

DETAILED DESCRIPTION OF THE INVENTION

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The present invention represents the discovery that a properly equipped kiosk may communicate with a properly equipped system to provide telecommunication service account set-up and payment autonomously with reduced customer service costs and reduced bad debt. The system according to the present invention is particularly useful in applications where delays may cause additional customer service calls or reduce the number of available customers, as well as applications where bad debt is expected to be high.

Figure 1A:
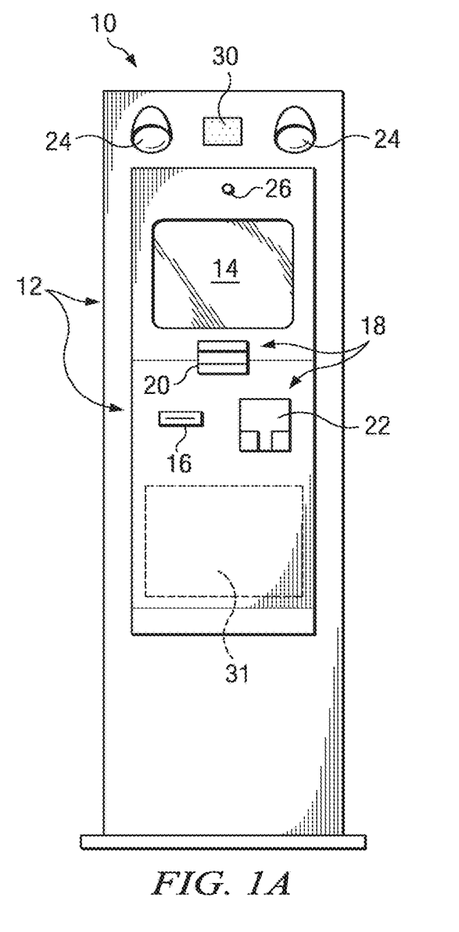
FIG. 1A is a front view of a kiosk.
Figure 1B:
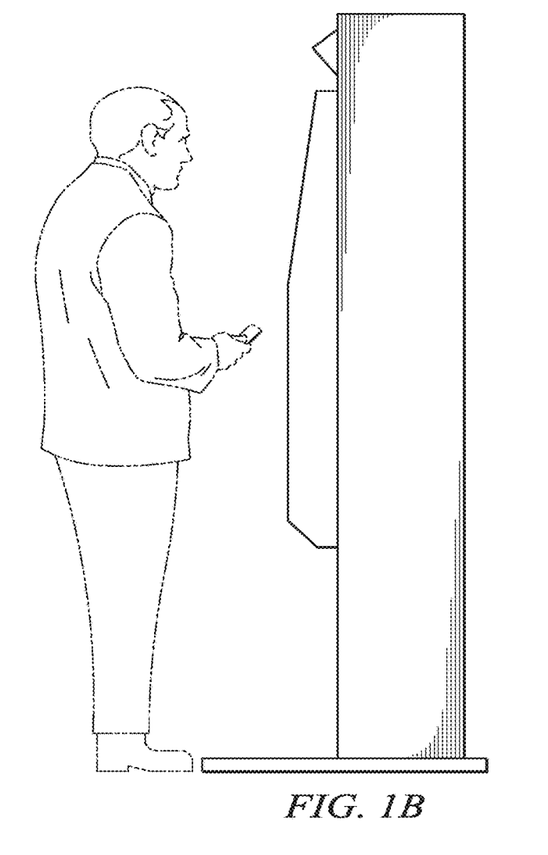
FIG. 1B is a side view of the kiosk of FIG. 1A.
Figure 1C:
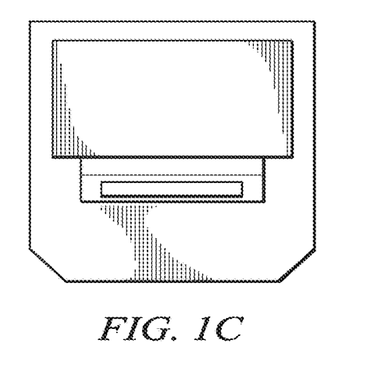
FIG. 1C is a top view of the kiosk of FIG. 1A.

Referring to FIGS. 1A and 1B in the drawings, a kiosk 10 is shown as an interface to be used by customers (shown in dashed lines) to conduct transactions relating to telecommunication services. Kiosk 10 has input/output devices 12 to communicate during a transaction. In a preferred embodiment, a touchscreen 14 provides for simultaneous input and output by allowing a customer to make selections in a menu driven environment. A printer 16 may also be used as an output device to provide a physical receipt of the transaction for a customer. Additionally, kiosk 10 has payment readers 18 to read various methods of payment. In a preferred embodiment payment readers 18 include a magnetic card reader 20 for reading credit cards, debit cards and other magnetic payment cards, as well as a bill validator 22 that reads and validates paper money. As new payment methods become commonplace, such as Radio Frequency Identification (RFID), barcodes, or wireless technologies, the appropriate payment readers 18 may be added to kiosk 10. In an embodiment, kiosk 10 further includes a near field communication (NFC) reader (not shown). The NFC reader is capable of accepting electronic payments made through a user's electronic device. In such embodiments, the user must simply hold an NFC-enabled electronic device near the NFC reader to trigger a payment and/or data exchange.

Continuing with FIGS. 1A and 1B of the drawings, kiosk 10 may include speakers 24 to provide audio output such as response feedback or oral instructions for customers with limited reading skills. Kiosk 10 preferably also includes identification recording devices 26 to provide a record of the individual who was the customer, or operator, for a particular transaction. In an embodiment, the transaction record is provided in real-time. Although preferred, the invention does not require the measurement and recording of biometric data. However, one skilled in the art will appreciate the advantages of taking such measurements. Recording devices 26 will record a biometric measurement of the customer for storage with the transaction record. In the preferred embodiment, a unidirectional cardoid microphone 28 is used to provide a voice recording, or voice print, and a camera 30 is used to record a still photograph of the customer's face, or face scan. Additionally, other biometric measurement devices, or sensors, may be used depending on the level of security desired and future developments in the security technologies field. Some other biometric measurements that may be used include fingerprints, cornea scans, and hand prints. Each technology has its own advantages and disadvantages depending on the end use. In an embodiment, a plurality of biometric measurements may be taken of the same customer, or kiosk operator, during a transaction. The plurality of biometric measurements may be combined to form composite biometric data. For example, in an embodiment, the biometric measurement devices capture a customer/operator's fingerprint, cornea scan, voice print, and hand print during a transaction. Combined, the collected data is stored as composite biometric data.

In an embodiment, the biometric measurement devices, or sensors, may be located on the kiosk. In an additional embodiment the biometric measurement devices, or sensors, may be located around the kiosk.

In an embodiment, at least one of the speaker, microphone, digital image scanner, and camera operate covertly. For example, the kiosk is configured to operate the microphone and/or camera to record audio and video information at all times. In an additional embodiment, the kiosk is configured to operate the microphone and/or camera to record audio and video information during transactions and/or when motion has been detected. A plurality of cameras may be strategically placed on the kiosk to provide a plurality of views from specified angles.

In an embodiment, the kiosk includes at least one dispensing device (not shown) capable of remitting an amount of money in cash, check, coins, gift cards, public transportation passes, or any other acceptable item of value. In such an embodiment, upon release from incarceration, an inmate can access the kiosk and obtain the value that remains on his/her account. In an embodiment, the dispensing device includes a check printer, configured to print a check in the amount requested.

The correctional facility may distribute and/or make available a multifunction wireless devices to inmates. Such multifunction wireless devices include a laptop, smartphone, tablet, cellular telephone, or any other handheld wireless communications device. When used in a correctional facility, such multifunction wireless devices are configured to communicate with correctional facility network, exclusively. Thereby, the correctional facility is able to monitor and/or control use of the multifunction wireless devices. In an embodiment, the multifunction wireless devices are configured to transmit and receive authorized communications to/from outsiders including text, audio, or video communications routed through the secure correctional facility network.

In an embodiment, the kiosk further includes a communications port (not shown) configured to connect to a mobile electronic device. In such embodiments, the communications port transfers/receives information with the mobile electronic device, such as a multifunction wireless device. For example, in an embodiment, a user purchases approved songs, applications "apps," games, through one or more features of the kiosk. In an embodiment, the song may be purchased by a user on behalf of an inmate, or by the inmate him/herself. Further, in an embodiment, the purchased song, app, and/or game may be synchronized with, downloaded to, transferred to, etc., the inmate's approved mobile device, i.e., multifunction wireless device. The communications port may be implemented as a wired port and/or a wireless port using, for example, WiFi, Bluetooth, or NFC protocols.

In an additional embodiment, the kiosk may be used to unlock an inmate's mobile device so it can be used outside the facility upon his/her release. In such embodiments, the user may retain all of the songs, apps, games, books, etc., that he/she has accumulated during incarceration. Further, the multifunction wireless device may be reconfigured to allow access to non-correctional facility networks. For example, when an inmate is in possession of a correctional facility issued smartphone that is configured to connect exclusively with correctional facility networks, upon release, the inmate may unlock his phone at the kiosk. Thereby, the unlocked smartphone may then access any available cellular or Wi-Fi network.

In such embodiments, the inmate may additionally purchase a wireless data/phone plan at the kiosk. The kiosk may further unlock additional functionalities of the multifunction wireless device. For example, in an embodiment where the institution has placed restrictions on time of day and/or duration of device use, the kiosk may unlock such restrictions. Or in an additional embodiment, where the institution has restricted use of the device to a certain area within the facility, the kiosk may unlock such restrictions. In short, any restriction that has been placed on the device may be unlocked and/or removed at the kiosk, so the mobile device may function without institutional any restrictions.

In an embodiment, at the time of unlocking the device, the kiosk may further download additional software onto the mobile device. For example, when an inmate is released on parole, there may be certain restrictions/conditions placed on that inmate's activities such as geographic boundaries, restraining orders, work requirements, curfew, etc. In an embodiment, the downloaded software may keep track of the inmate's whereabouts and/or communications habits and may automatically report information under the parole guidelines and/or requirements.

In an embodiment, when the device is unlocked, the system may store the inmate's preferences, settings, restrictions, and/or data such as games, apps, music, or any other approved content. In the event the inmate returns to the correctional facility, for any reason, the data may be restored to the device associated with the returning inmate.

The physical housing of the preferred embodiment of kiosk 10 shown in FIGS. 1A and 1B is optimized to reduce footprint while still providing adequate user interaction and security. Kiosk 10 may also be built into a wall with public access on one side of the wall and restricted access on the opposite side of the wall. Additionally, kiosk 10 may provide additional input/output devices for the handicapped, such as a lower touchscreen 14 for wheelchair access, volume controls for the hearing impaired, or a braille display for the blind. Furthermore, the kiosk is powered by a processor 31 that directs the above listed features and collects data. Processor 31 may be a standard personal computer, which provides ease of repair and cost savings. Processor 31 is also adapted to communicate with a communications network, as will be described in more detail below. In an embodiment, the processor is local to the kiosk. In an additional embodiment, the processor may be in electronic communication with the kiosk over a network connection.

Figure 2:
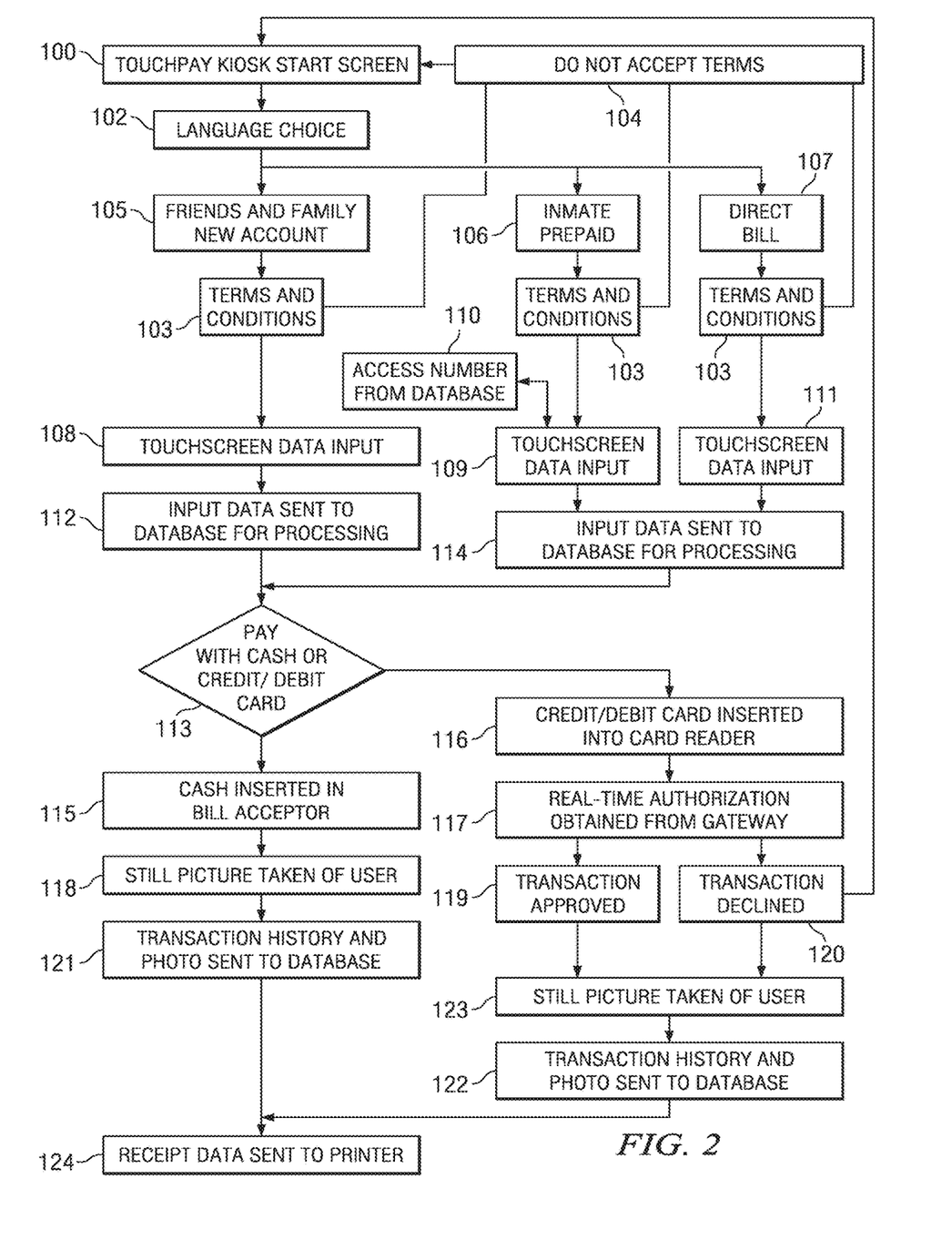
FIG. 2 is a flow chart of an operation of a kiosk.
Figure 4:
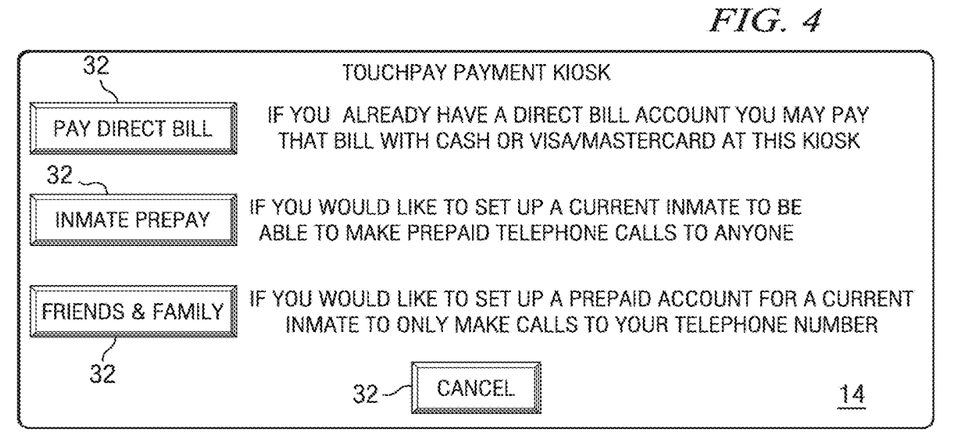
FIG. 4 is an example of a menu screen that may be presented at a kiosk.

Referring now to FIG. 2 of the drawings, an operation of kiosk 10 is shown as a flow chart. "Touchpay Kiosk Start Screen" 100 allows the customer to indicate when the customer is prepared to begin a transaction. "Language Choice" 102 allows the customer to choose a preferred language in which to communicate with kiosk 10. Because the system is menu drive and field-based, the number of languages that may be chosen is limited only by the initial translation costs for each language and the availability of appropriate fonts to display each language. Once a language is chosen at "language choice" 102, the remainder of the transaction is conducted in the chosen language until the customer returns to "start screen" 100. After choosing the appropriate language, the customer is presented with at least three choices, as shown in FIG. 4. The choices shown are: "Friends and Family New Account" 105; "Inmate Prepaid" 106; and "Direct Bill" 107. These three basic transactions operate slightly differently, but have significant parallels. Upon, selecting any of these three choices, the customer is presented with "Terms and Conditions" 103, which allows the customer to agree with certain terms and conditions for the use of kiosk 10 and the related system or to disagree. Agreement is required to proceed and failure to agree leads to "do not accept terms" 104 followed by "start screen" 100. One skilled in the art would recognize that additional choices and services can be provided, including but not limited to commissary payments, traffic citations, property tax citations, and the like.

After selecting the appropriate transaction, a "touchscreen data input" 108, 109, 111 requires the entry of all pertinent information to setup the appropriate account. After entry of "touchscreen data input" 109 for an inmate prepaid transaction an "access number obtained from database" 110 obtains an active access number for the customer from a database of prepaid access numbers 126 (shown in FIG. 3). "Input data sent to database for processing" 112, 114 indicates that all data input by the customer at "touchscreen data input" 108, 109, 111 is sent to a database of customer information 125 (shown in FIG. 3) for processing while payment information is gathered. The customer then must choose an appropriate payment method at "pay with cash credit/debit or card" 113. If cash payment is selected, the cash is fed into bill validator 22 as shown at "cash inserted in bill acceptor" 115. If credit card or debit card payment is chosen, the appropriate card is fed into magnetic card reader 20 as indicated by "credit/debit card inserted into card reader" 116, the card reader 20 then transmits the data to a gateway for real-time authorization or denial as indicated at "real-time authorization obtained from gateway" 117, and proceed to "transaction approved" 119 or "transaction declined" 120. This provides for real time set up and authorization of an account or at least substantially contemporaneous with the transaction.

At this point, whether the bills are validated or not, or whether card payment is accepted or not, the transactions all record relevant transaction data for review. Biometric data is gathered at "still picture taken of user" 118, 123 and the biometric data is sent with the complete details of the transaction to a database at "transaction history and photo sent to database" 121, 122. Certain data is then printed for the customer to retain a physical receipt at "receipt data sent to printer" 124.

All transaction information is stored in a memory and/or database, including any action performed by a user, an inmate, and/or a remote officer. In an embodiment, the transaction record further includes at least one of: a voice recording, images of the user, video captured before, during, and/or after the transaction, messages sent or received, conversations held between the user and a remote officer, and any other data captured during the transaction. The transaction records are available to institution officials for investigative purposes. In an embodiment, the system per-forms keyword scans, translation, file preparation and/or encryption on the stored data. In an embodiment the memory and/or database is local to the kiosk. In an additional embodiment, the memory and/or database is in electronic communication with the kiosk over a network link. In yet an additional embodiment, the database is implemented as a central remote database.

Figure 3:
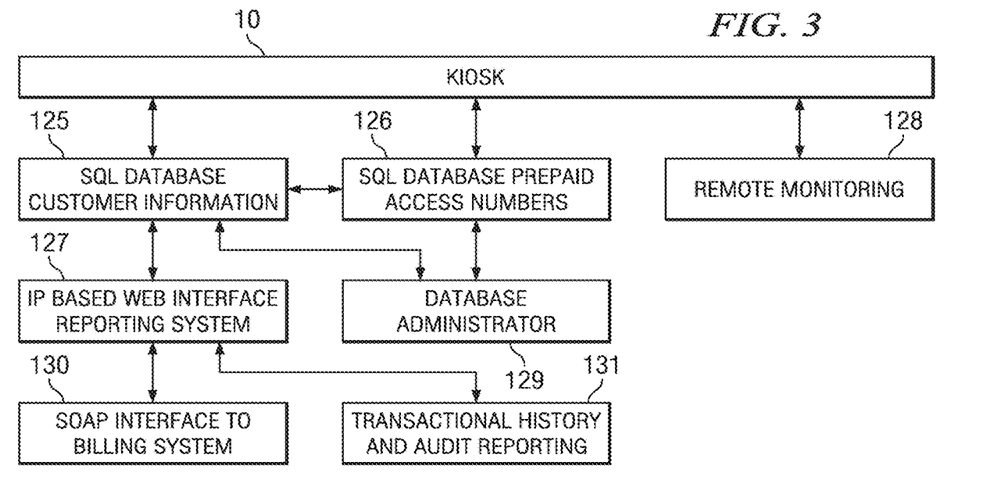
FIG. 3 is a schematic of a system including the kiosk of FIG. 2.

Referring now to FIG. 3 of the drawings, kiosk 10 is shown schematically in relation to the system for providing account setup and management. Kiosk 10 communicates with database of prepaid access numbers 126 and database of customer information 125. Database administrator 129 communicates with databases 125, 126 to maintain database integrity. Remote monitoring 128 monitors one or more kiosk 10 and may selectively activate various features such as the biometric recording devices 26 at additional intervals. In an embodiment, the biometric recording devices may be controlled remotely. Remote monitoring 128 also allows for selective shutdown of kiosk 10 as well as diagnosis and trouble shooting of kiosk 10. Additional features may be controlled remotely. Specifically, at least one of the speaker, microphone, digital image scanner, and camera may be controlled remotely. For example, the direction of the camera and/or the direction of the captured video may be controlled by a remote officer. In an embodiment, the remote officer may control camera angle, camera movement, zoom, field or view, etc., in real-time. In an additional embodiment, the remote officer remotely accesses the kiosk speaker to assist a local user, provide instruction, and/or instruct the user that unlawful activity has been detected.

A reporting system 127 represented by "IP based web interface reporting system" 127 allows for access to the customer information database 125 and transactional data stored in the customer information database 125. The reporting system is connected to a "SOAP/WL interface to billing system" 130 to provide billing information for the telecommunication provider and a "transactional history and audit reporting" 131 to provide audit reports and transactional histories on an automated basis or by query to the reporting system 127. Reporting System 127 is preferably web based to provide a graphical user interface and conventional query tools based on the database structure.

Referring now to FIG. 4 of the drawings, an example of a graphical user interface for use on a touchscreen 14 is shown, in English. The menu driven interface has four choices, three continuing to provide service and one returning to the start screen 100. Touchscreen 14 allows the user to simply touch icons 32 to choose one of the listed choices.

Figure 5:
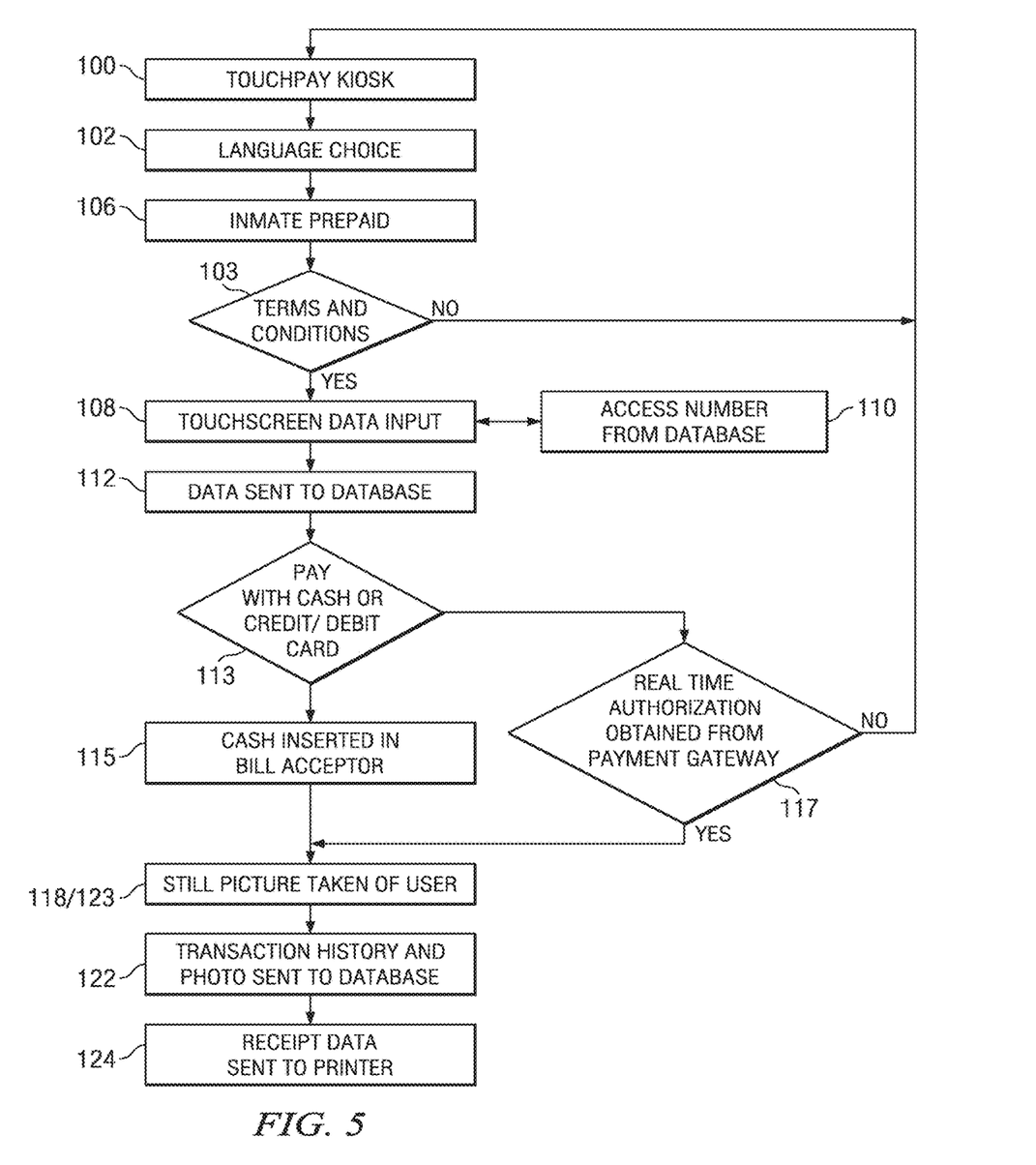
FIG. 5 is a flow chart of an Inmate Prepaid Account transaction.
Figure 6:
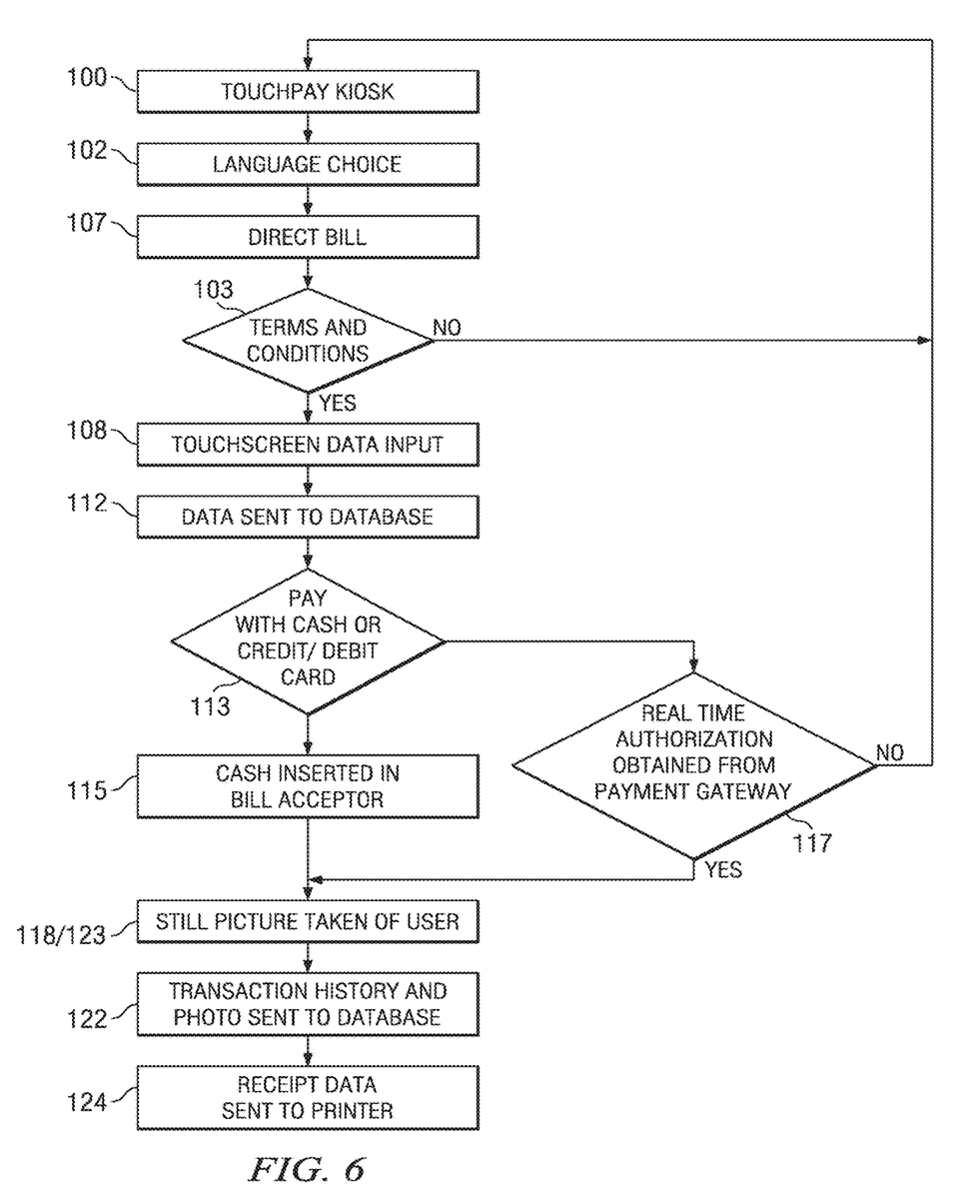
FIG. 6 is a flow chart of a Direct Bill transaction.
Figure 8:
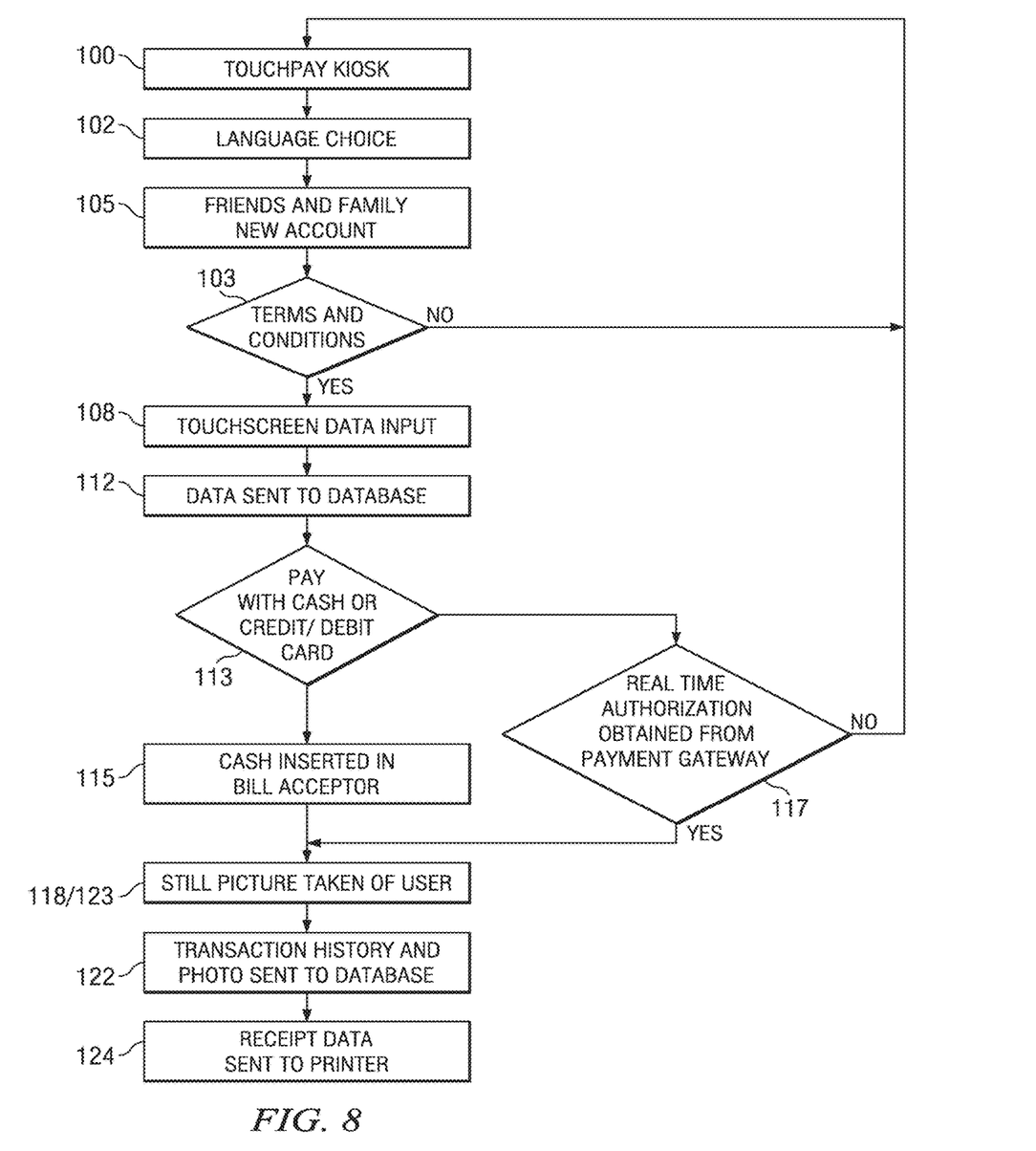
FIG. 8 is a flow chart of a Friends and Family transaction.

Referring now to FIGS. 5, 6, and 8 of the drawings, each is a more detailed portion of the flow chart of FIG. 2. FIG. 5 illustrates an Inmate Prepaid Account transaction, while FIG. 6 illustrates a Direct Bill transaction, and FIG. 8 illustrates a Friends and Family transaction. A comparison of the three figures shows that the transaction structure is similar and applicable to many different transaction types.

Figure 7:
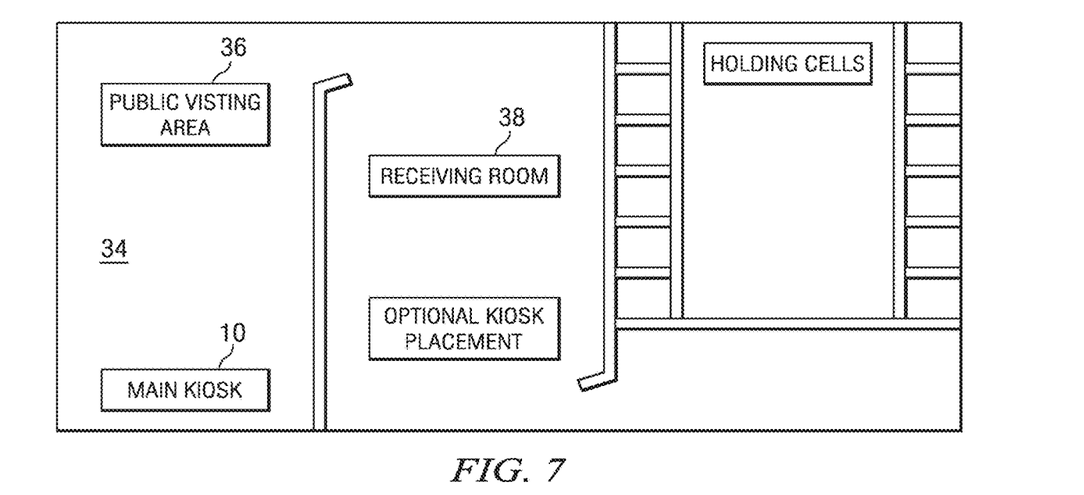
FIG. 7 is a schematic of possible kiosk locations within a correctional facility.

Referring now to FIG. 7 of the drawings, a schematic of a correctional facility 34 illustrates the possible locations for a kiosk 10. Because it is expected that many transactions will be conducted by individuals other than the inmate, such as friends or family, a kiosk 10 may be located in the public visiting 36 area to allow friends or family to set-up an account or make a payment during a visit to the correctional facility 34. As discussed above, inmates will likely want to set-up an account upon booking, especially for short stay inmates, and therefore a kiosk 10 may be located in a receiving room 38 for inmate access upon receipt into the correctional facility 34 and at other times as dictated by the staff. Where multiple kiosks 10 are being used in a single facility, the kiosks 10 may be directly joined by a wired or wireless network to provide redundant services and backup.

In an embodiment, the kiosk is placed in a facility accessible to the general public. In such embodiments, the facilities are under the control of a specific jurisdiction. For example, the kiosk may be located in facilities such as a courthouse, a department of motor vehicles, a utilities company, a grocery store, a police station, a correctional facility, or any other similar facility. In further embodiments, the kiosk further includes a payment or dispenser system capable of facilitating a jurisdiction-related payment.

For example, in an embodiment where the kiosk is located at a utilities company facility, a user may gain access to his account by operating the kiosk and entering personal or account identifying information. The kiosk accesses the account information through a network connection and provides account details for the user. The user may then pay a bill related to the account using the kiosk payment system.

In an embodiment where a kiosk is located within a visiting area of a correctional facility, a user may gain access to an account associated with an inmate being held at that facility. Upon accessing the inmate's account, the user/depositor may provide cash or credit card information at the payment system in order to purchase music, apps, books, or to add money to the inmate's account.

Figure 9:
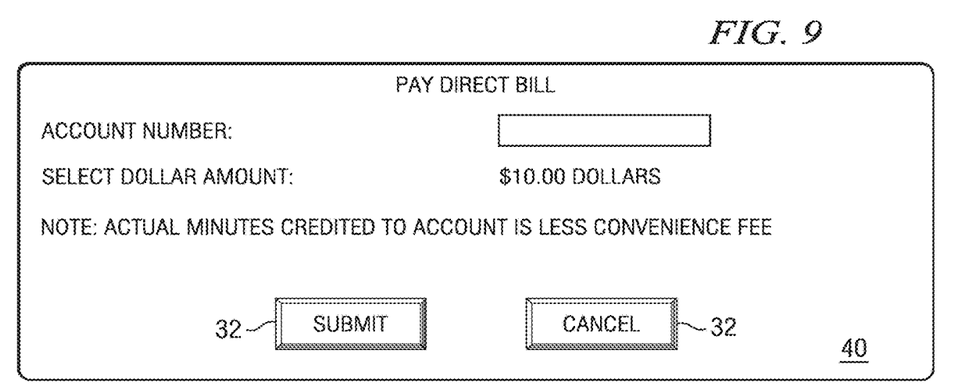
FIG. 9 is an example of a Graphical Customer Interface with a touch sensitive keyboard.

Referring now to FIG. 9 of the drawings, a screen shot of the graphical user interface of a kiosk 10 is shown with a display area 40 having selection icons 32 and a touchscreen keyboard 42 (not shown). The touchscreen keyboard 42 provides customer input without having the added complexity of additional hardware, and thereby reduces maintenance costs for the kiosk 10. In an embodiment, the touchscreen keyboard is used to create a message that will be forwarded to the inmate associated with the account designated by a depositor. For example, in such an embodiment the user may send a message such as "I just posted $50.00 to your account," "I will visit you this Saturday by video visitation," "I just purchased five songs for your multifunction wireless device." In an additional embodiment, icons or GUIs having commonly used messages displayed thereon. In such embodiments, the user must select the icon in order to send the commonly used message to the inmate associated with the depositors account.

Figure 10:
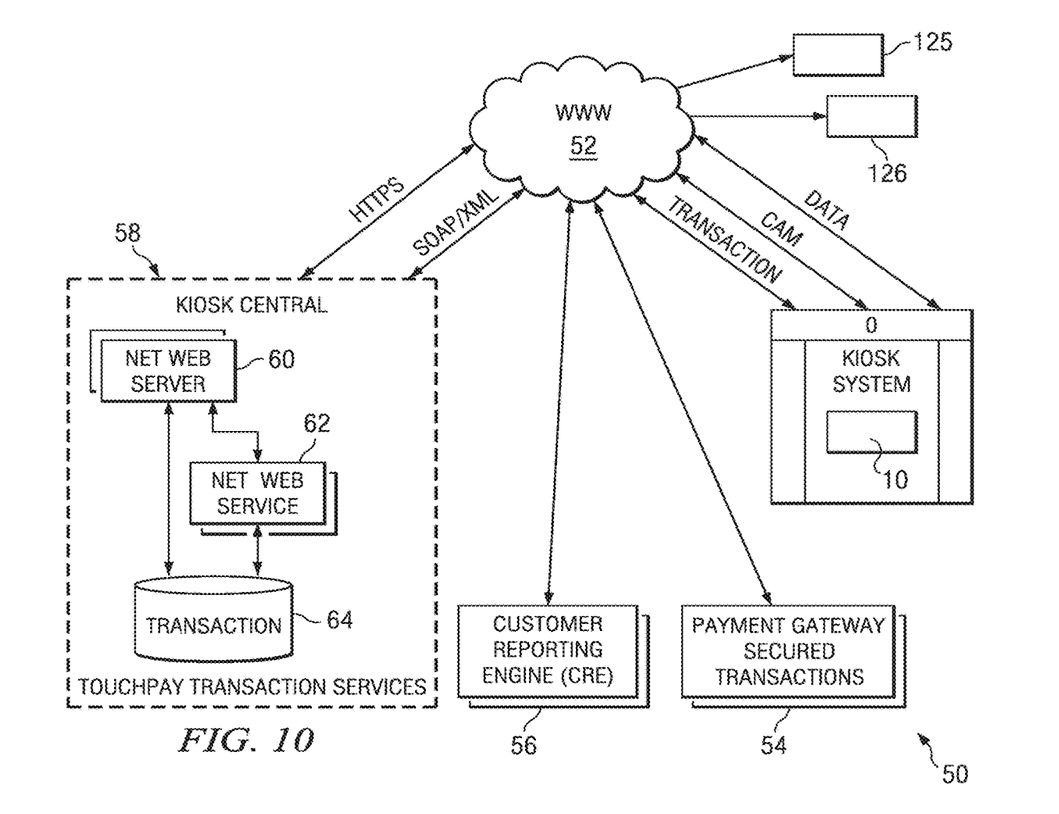
FIG. 10 is a schematic of a system associated with a kiosk for processing account transactions.

Referring now to FIG. 10 of the drawings, a system 50 is shown for processing transactions from a kiosk 10. System 50 comprises kiosk 10 and a data connection between kiosk 10 and a network 52, such as the Internet or a similarly robust communications network. A gateway 54 communicates with the network 52 for approval of credit card or debit card transactions at the kiosk 10, such as authorize.net or another account verification gateway. A customer reporting engine 56 communicates with the network 52 to allow for customized reports telecommunication service providers. A kiosk central server 58 communicates with the network 52 to collect and store all transaction data from the kiosk 10, provide reporting data to the customer reporting engine 56, and store authorization data from the gateway 54 in conjunction with transaction data captured from kiosk 10. Transaction data will include financial information, personal information and biometric measurements collected from kiosk 10. In the embodiment shown, kiosk central server 58 comprises a web server 60, a web service 62, and a database 64. Web server 60 and web service 62 provide a secure and robust connection between database 64 and network 52. In an embodiment, the kiosk is configured to provide web access for a local user. In such embodiments, the local user may access his/her bank account, email, web-based digital payment service, or other web account. For example, the local user may access their bank account to set up a payment and/or transfer money between the bank account and an account associated with a specific inmate.

Figure 11:
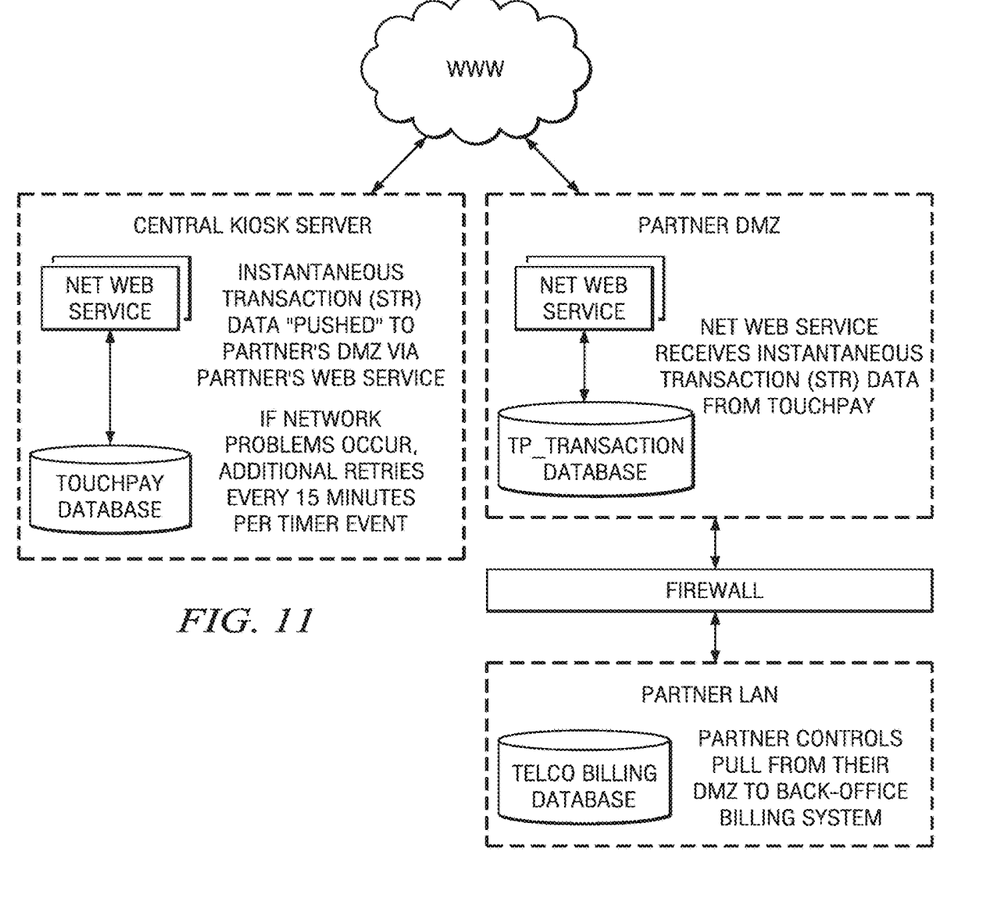
FIG. 11 is a schematic of a system associated with a kiosk for processing account transactions.

Referring now to FIG. 11 of the drawings, the transmission of transactional data, referred to individually as standard transaction records or STRs, are provided to a telecommunications provider, or partner, via push over an accessible network, such as the World Wide Web or Internet, to the partner. Specifically, in an embodiment, a real-time transaction record is pushed from a local processor to one or more service partner billing systems. Because of security concerns inherent in any network, the data will typically be received outside of the partner firewall, in what is commonly referred to as a "demilitarized zone" or DMZ. This allows the partner to receive the data and ensure that no harm will be done to the partner network by allowing the data inside the network firewall. Once the data is within the firewall, it may be processed into the partner billing system. FIG. 11 illustrates one of many secure means for transferring transaction data to partners. While the system shown has been developed to meet current partner demands, variations to this system are easily applied to the current system to meet future partner demands. Furthermore, the partner may provide a wide variety of services including telecommunications or commissary services.

Figure 12:
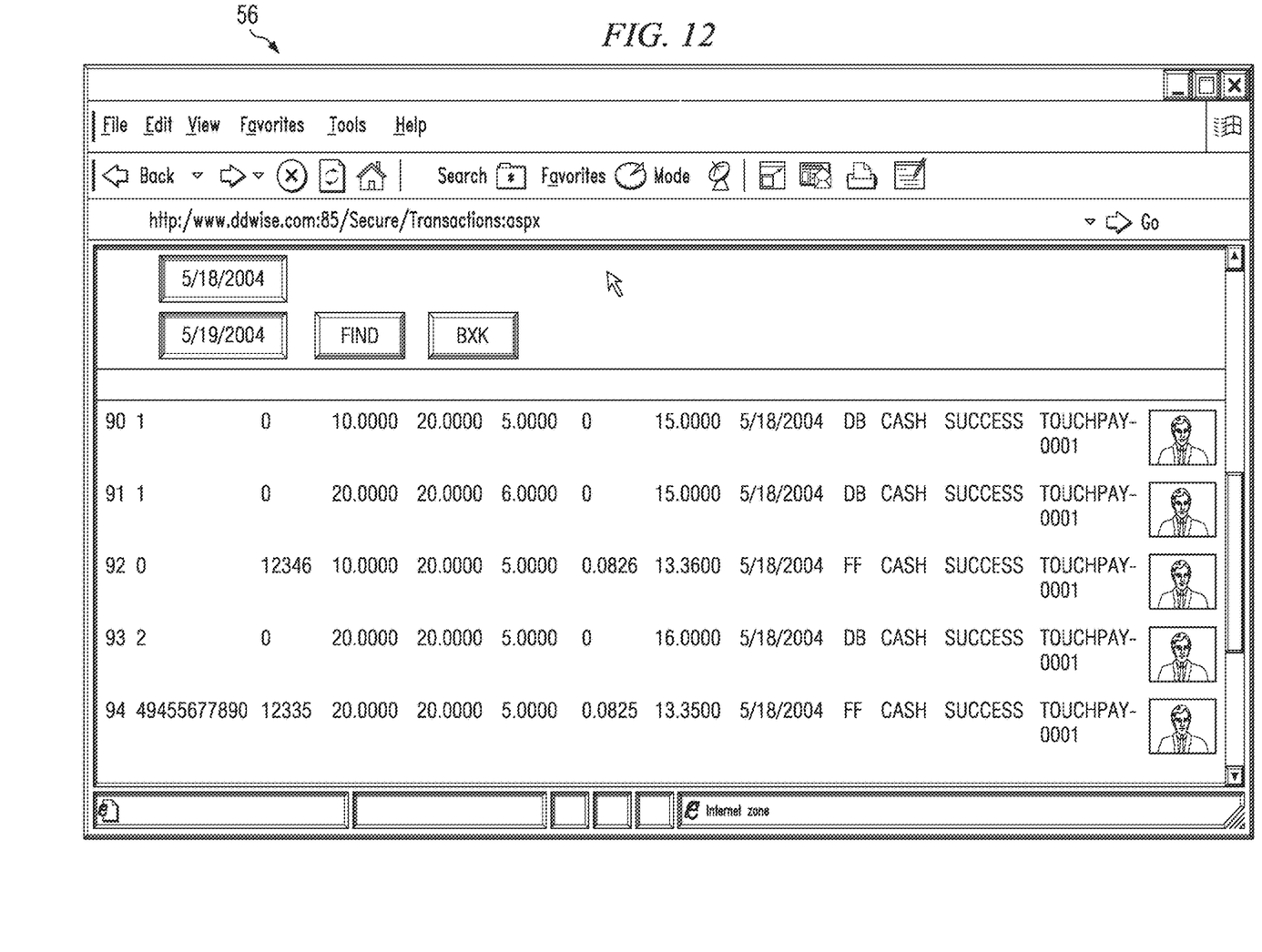
FIG. 12 is an example of a Graphical User Interface for a Customer Report Engine.

Referring now to FIG. 12 of the drawings, a graphical user interface for the customer reporting engine 56 is shown with sample transaction data. Transaction data includes the following fields:
Transaction Unique Identifier;
Kiosk Identity;
Kiosk Location (often includes multiple fields such as street address, city, state, zip code, room number, room description, location in facility, or kiosk number in facility);
Time and date code;
Amount of transaction;
Type of transaction;
Form of payment;
Authorization information (often includes multiple fields such as success, positive or negative, and confirmation code); and
Biometric data (may include photo, face scan, fingerprint scan, voice recording, voice scan, iris scan, or other biometric data used to distinguish an individual from the general population).

The fields are provided in a web based application that allows queries based on the fields to provide customized reports. Such reports can help to provide more efficient customer service, fraud prevention, system audits, and troubleshooting.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A kiosk for receiving an inmate service account payment, comprising:
at least one processor;
a touchscreen in communication with the processor, wherein the touchscreen is configured to display information from the processor and is further configured to receive input from an operator of the kiosk;
a communications port in communication with the processor, wherein the communications port is configured to:
exchange data with at least one of a wireless device associated with an inmate service account and a remote; and
transmit purchased content comprising at least one of a game, application, music, and video, to the wireless device;
at least one hidden camera that captures images at the kiosk;
a payment acceptor to receive the inmate service account payment, wherein the payment acceptor comprises at least one of a bill validator, a near field communication reader, and a magnetic card reader; and
a dispensing device configured to remit an item of value, to an inmate associated with the inmate service account,
wherein the kiosk is configured to install limited-use restrictions onto the at least one wireless device associated with the inmate service account, based on at least one restriction of the inmate associated with the inmate service account and a correctional facility,
wherein the kiosk is further configured to unlock the at least one wireless device associated with the inmate service account at a time when the inmate is released from the correctional facility by removing the limited-use restrictions from the at least one wireless device through the communications port,
wherein, after the limited-use restrictions are removed from the at least one wireless device, the kiosk is further configured to download at least one post-release restriction onto the at least one wireless device associated with an inmate service account based on the inmate associated with the inmate service account and a parole requirement.

2. The kiosk of claim 1, wherein the hidden camera is configured to capture images at a predetermined portion of an inmate service account transaction.

3. The kiosk of claim 1, wherein the hidden camera is configured to capture images as directed by the remote facility over the network.

4. The kiosk of claim 1, wherein the communications port is further configured to provide web access to the operator of the kiosk so the operator can access at least one of a bank account or a payment service associated with the operator, to transfer funds into the inmate service account.

5. The kiosk of claim 1, wherein the item of value comprises at least one of cash, coins, a check, a gift card, and a public transportation pass.

6. The kiosk of claim 1, wherein the item of value is determined based at least in part on an inmate service account balance at a time when the inmate associated with the inmate service account is released from the correctional facility.

7. The kiosk of claim 1, wherein the payment acceptor is configured to accept at least one of a utility payment, a traffic citation fee, a bail bond payment, a child-support payment, a probation payment, a phone bill, and court fees.

8. The kiosk of claim 1, wherein the touchscreen is configured to:
display an electronic keyboard on the touchscreen,
receive input from the operator of the kiosk at the electronic keyboard, the input forming a message, and
transmit the received message to the processor.

9. A system for receiving an inmate service account payment, the system comprising:

a first biometric sensor that captures first biometric data of a first type;

a second biometric sensor that captures second biometric data of a second type;

a kiosk at a correctional facility that receives transaction information associated with the inmate service account payment and collects composite biometric data that includes the first biometric data and the second biometric data from an operator of the kiosk, wherein the kiosk comprises at least one hidden camera;

a database that stores the transaction information and the composite biometric data;

a first network that allows communication between the kiosk and the database;

a local processor that generates a real-time transaction record that includes the stored transaction information and the stored composite biometric data; and one or more additional networks that allow communication between the database and one or more service partner billing systems, wherein the service partners provide one or more types of services to an inmate associated with the inmate service account;

wherein the kiosk further comprises:

a dispensing device configured to remit at least one of cash, coins, a check, a gift card, and a public transportation pass, based at least in part on an account balance, and a communications port configured to exchange data with at least one wireless device associated with an inmate service account and to transmit purchased content comprising at least one of a game, application, music, and video content, to the wireless device;

wherein at least one wireless device is associated with the inmate service account is configured to include limited-use restrictions based on the inmate associated with the inmate service account and the correctional facility, wherein the kiosk is further configured to unlock the at least one wireless device associated with the inmate service account at a time when the inmate is released from the correctional facility by removing the limited-use restrictions from the at least one wireless device through the communications port, wherein, after the limited-use restrictions are removed from the at least one wireless device, the kiosk is further configured to download at least one post-release restriction onto the at least one wireless device associated with an inmate service account based on the inmate associated with the inmate service account and a parole requirement.

10. The system of claim 9, wherein the kiosk further comprises a touch screen configured to display information in a plurality of languages.

11. The system of claim 9, wherein the kiosk further comprises an identification recording device to collect third biometric data of a third data type.

12. The system of claim 9, wherein the first biometric data comprises a handprint.

13. The system of claim 12, wherein the second biometric data comprises at least one of: a voice recording, a fingerprint, a cornea scan, and a photograph.

14. The system of claim 9 further comprising a customer reporting engine that queries the database for transaction records.

15. The system of claim 9, wherein the processor correlates conditions of acceptance for the inmate service account payment amount according to restrictions placed on the inmate by the correctional facility.

16. The system of claim 9, wherein the hidden camera is controlled remotely.

17. The kiosk of claim 1, wherein the parole requirement is at least one of a geographic boundary outside the correctional facility, a restraining order, a work requirement, and a curfew.

18. The system of claim 9, wherein the parole requirement is at least one of a geographic boundary outside the correctional facility, a restraining order, a work requirement, and a curfew.

* * * * *

UNITED STATES PATENT AND TRADEMARK OFFICE
CERTIFICATE OF CORRECTION

PATENT NO. : 11,062,412 B2  
APPLICATION NO. : 15/350603  
DATED : July 13, 2021  
INVENTOR(S) : Charles Craig Bullard, David Duwayne Wise and Stephen Lee Hodge Page 1 of 1

It is certified that error appears in the above-identified patent and that said Letters Patent is hereby corrected as shown below:

On the Title Page

In item (54) Title and in the Specification, replace "MACHINES AND PROCESS FOR MANAGING A SERVICE ACCOUNT" with --MACHINE AND PROCESS FOR MANAGING A SERVICE ACCOUNT--.

In the Claims

In Column 10, Line 6, replace "remote; and" with --remote facility; and--.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*